(12) United States Patent
Jones et al.

(10) Patent No.: US 10,656,266 B2
(45) Date of Patent: May 19, 2020

(54) SYSTEM AND METHODS FOR ESTIMATING STORAGE CAPACITY AND IDENTIFYING ACTIONS BASED ON SOUND DETECTION

(71) Applicant: Walmart Apollo, LLC, Bentonville, AR (US)

(72) Inventors: Matthew Allen Jones, Bentonville, AR (US); Aaron James Vasgaard, Fayetteville, AR (US); Nicholaus Adam Jones, Fayetteville, AR (US); Robert James Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 178 days.

(21) Appl. No.: 15/698,055

(22) Filed: Sep. 7, 2017

(65) Prior Publication Data

US 2018/0074194 A1 Mar. 15, 2018

Related U.S. Application Data

(60) Provisional application No. 62/393,767, filed on Sep. 13, 2016, provisional application No. 62/393,769, filed on Sep. 13, 2016.

(51) Int. Cl.
*G01S 15/10* (2006.01)
*G01S 15/42* (2006.01)
(Continued)

(52) U.S. Cl.
CPC .............. *G01S 15/10* (2013.01); *G01S 5/30* (2013.01); *G01S 11/14* (2013.01); *G01S 15/42* (2013.01); *H04R 1/40* (2013.01); *H04R 29/00* (2013.01)

(58) Field of Classification Search
CPC . G01S 15/10; G01S 5/30; G01S 11/14; G01S 15/42; H04R 1/40; H04R 29/00
(Continued)

(56) References Cited

U.S. PATENT DOCUMENTS

| 4,112,419 A | 9/1978 | Kinoshita et al. |
| 4,247,922 A | 1/1981 | Jackson et al. |

(Continued)

FOREIGN PATENT DOCUMENTS

| CA | 2494396 C | 10/2013 |
| EP | 2884437 A1 | 6/2015 |

(Continued)

OTHER PUBLICATIONS

International Search Report and Written Opinion from related international patent application No. PCT/US2017/050250 dated Nov. 13, 2017.
(Continued)

*Primary Examiner* — Lisa M Caputo
*Assistant Examiner* — Rose M Miller
(74) *Attorney, Agent, or Firm* — McCarter & English, LLP; David R. Burns

(57) ABSTRACT

Described in detail herein are methods and systems for estimating storage capacity of a storage unit disposed in a facility based on echoes detected by microphones. The microphones can detect sounds generated in the warehouse and reflected off the storage unit structures. The microphones detect the intensity of the sounds. The microphones can encode the sounds and the intensity of the sounds in time-varying electrical signals and transmit the time-varying electrical signals to a computing system. The computing system can decode the sounds and the intensity of the sounds from the time-varying electrical signals and estimate storage
(Continued)

capacity of a storage unit from which the sounds reflected off of based on the intensity of the sounds.

21 Claims, 6 Drawing Sheets

(51) Int. Cl.
*G01S 5/30* (2006.01)
*G01S 11/14* (2006.01)
*H04R 1/40* (2006.01)
*H04R 29/00* (2006.01)

(58) Field of Classification Search
USPC .......................... 73/597, 286, 628, 645, 586
See application file for complete search history.

(56) References Cited

U.S. PATENT DOCUMENTS

| | | | |
|---|---|---|---|
| 4,605,924 | A | 8/1986 | Marini et al. |
| 4,950,118 | A | 8/1990 | Mueller et al. |
| 5,471,195 | A | 11/1995 | Rickman |
| 5,712,830 | A | 1/1998 | Ross et al. |
| 6,296,081 | B1 | 10/2001 | Nagai et al. |
| 6,633,821 | B2 | 10/2003 | Jackson et al. |
| 7,047,111 | B2 | 5/2006 | Schliep et al. |
| 7,162,043 | B2 | 1/2007 | Sugiyama et al. |
| 7,379,553 | B2 | 5/2008 | Nakajima et al. |
| 7,957,225 | B2 | 6/2011 | Steadman |
| 8,059,489 | B1 | 11/2011 | Lee et al. |
| 8,091,421 | B2 | 1/2012 | Pert et al. |
| 8,188,863 | B2 | 5/2012 | Rinkes et al. |
| 8,412,485 | B2 | 4/2013 | Brown |
| 8,620,001 | B2 | 12/2013 | Peachey et al. |
| 8,682,675 | B2 | 3/2014 | Togami et al. |
| 8,706,540 | B2 | 4/2014 | Mangat et al. |
| 9,367,831 | B1 | 6/2016 | Besehanic |
| 2005/0281135 | A1 | 12/2005 | Willins et al. |
| 2006/0197666 | A1 | 9/2006 | Babich et al. |
| 2007/0080025 | A1 | 4/2007 | Yamada et al. |
| 2008/0011554 | A1 | 1/2008 | Broesel et al. |
| 2008/0136623 | A1 | 6/2008 | Calvarese |
| 2009/0190769 | A1 | 7/2009 | Wang et al. |
| 2010/0110834 | A1 | 5/2010 | Kim et al. |
| 2010/0176922 | A1 | 7/2010 | Schwab et al. |
| 2012/0070153 | A1 | 3/2012 | Jonsson |
| 2012/0071151 | A1 | 3/2012 | Abramson et al. |
| 2012/0081551 | A1 | 4/2012 | Mizuno et al. |
| 2012/0206264 | A1 | 8/2012 | Gannot et al. |
| 2012/0214515 | A1 | 8/2012 | Davis et al. |
| 2012/0330654 | A1 | 12/2012 | Angell et al. |
| 2013/0024023 | A1 | 1/2013 | Siegel et al. |
| 2014/0167960 | A1 | 6/2014 | Argue et al. |
| 2014/0222521 | A1 | 8/2014 | Chait |
| 2014/0232826 | A1 | 8/2014 | Halata |
| 2014/0379305 | A1 | 12/2014 | Kumar |
| 2015/0103627 | A1 | 4/2015 | Bartov et al. |
| 2015/0103628 | A1 | 4/2015 | Bartov et al. |
| 2015/0262116 | A1 | 9/2015 | Katircioglu et al. |
| 2015/0319524 | A1 | 11/2015 | Wang et al. |
| 2016/0163168 | A1 | 6/2016 | Brav et al. |

FOREIGN PATENT DOCUMENTS

| | | |
|---|---|---|
| FR | 2774474 A1 | 8/1999 |
| TW | 1426234 | 2/2014 |
| WO | 2005073736 A2 | 8/2005 |
| WO | 2009003876 A1 | 1/2009 |
| WO | 2012119253 A1 | 9/2012 |
| WO | 2013/190551 A1 | 12/2013 |
| WO | 2014113891 A1 | 7/2014 |

OTHER PUBLICATIONS

International Search Report and Written Opinion from related International Patent Application No. PCT/US2017/050492 dated Jan. 2, 2018.

International Search Report and Written Opinion from related International Patent Application No. PCT/US2017/050429 dated Jan. 2, 2018.

De Coensel, Bert, et al., Smart Sound Monitoring for Sound Event Detection and Characterization, Inter-noise 2014.

Bacheldor, Beth, M/A-COM Combines RFIDa nd Sensors for Smarter Forklift, RFID Journal Virtual Events, last viewed May 25, 2016.

Perez-Gonzalez, F. et al., Road Vehicle Speed Estimation From a Two-Mircophone Array, Departamento de Teoria de la Senal y las Comunicaciones, Vigo Univ. DOI: 10.1109/ICASSP.2002.5744046 Conference: Acoustics, Speech, and Signal Processing, 2002. Proceedings. (ICASSP '02). IEEE International Conference on, vol. 2 Source: IEEE Xplore.

Pallet Detection on Forklifts: Precise Positioning with Varikont L2 Ultrasonic Sensors, http://www.pepperlfuchs.corn/global/en/22595. htm, Pepper+Fuchs, 2016.

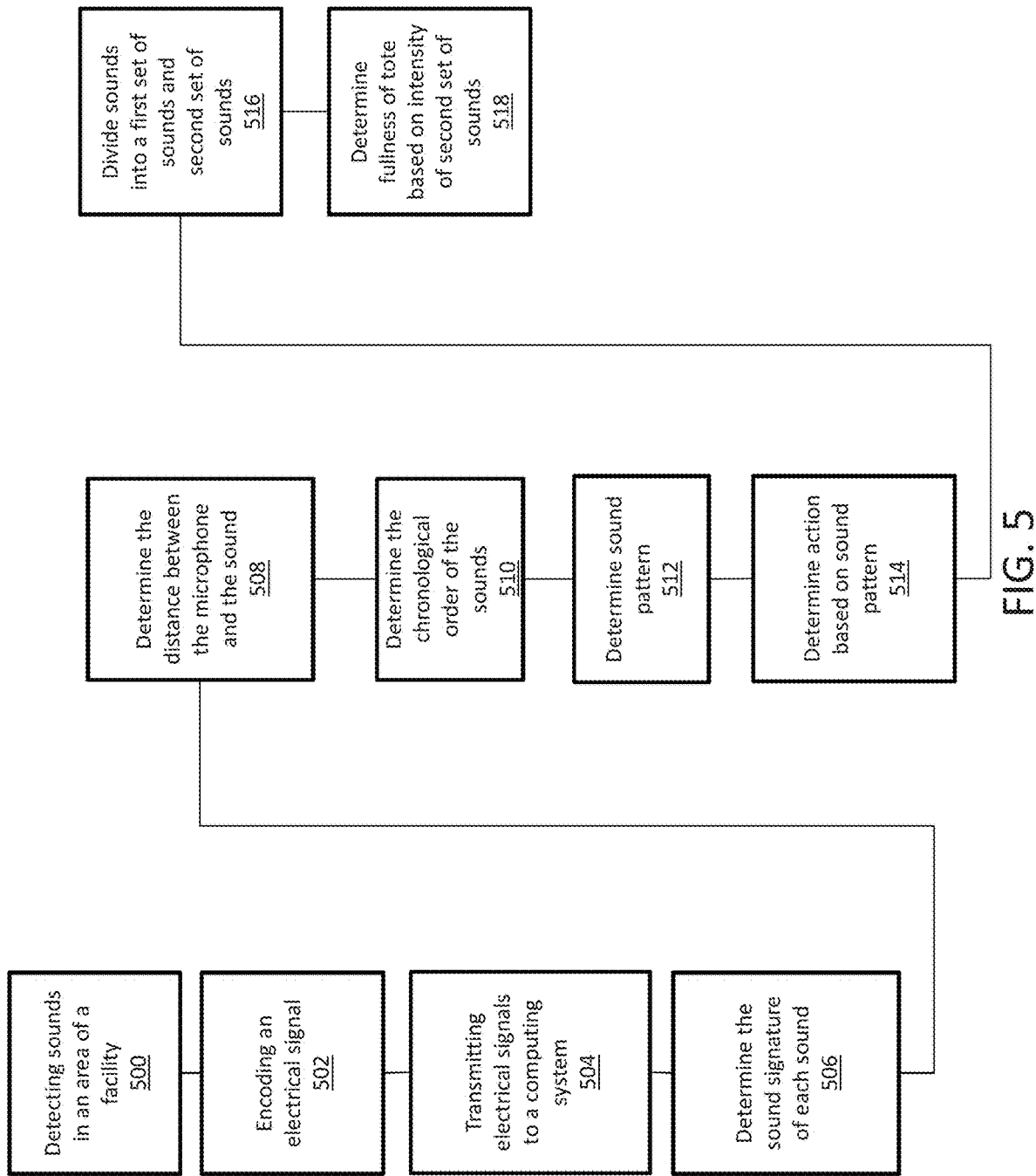

SYSTEM AND METHODS FOR ESTIMATING STORAGE CAPACITY AND IDENTIFYING ACTIONS BASED ON SOUND DETECTION

CROSS-REFERENCE TO RELATED PATENT APPLICATION

This application claims priority to U.S. Provisional Application No. 62/393,767 filed on Sep. 13, 2016 and U.S. Provisional Application No. 62/393,769 filed on Sep. 13, 2016, the content of each is hereby incorporated by reference in its entirety.

BACKGROUND

It can be a slow and error prone process to determine the available storage capacity in storage units.

BRIEF DESCRIPTION OF DRAWINGS

Illustrative embodiments are shown by way of example in the accompanying drawings and should not be considered as a limitation of the present disclosure:

FIG. 5 is a flowchart illustrating a process implemented by a storage capacity estimation and action identification system according to exemplary embodiments of the present disclosure.

DETAILED DESCRIPTION

Described in detail herein are methods and systems for estimating storage capacity of a storage unit disposed in a facility based on echoes detected by microphones. For example, action identification systems and methods can be implemented using an array of microphones disposed in a facility, a data storage device, and a computing system operatively coupled to the microphones and the data storage device.

The array of microphones can be configured to detect various sounds, which can be encoded in electrical signals that are output by the microphones. The sounds can be arbitrary and disparate sounds generated in the facility. For example, the microphones can be configured to detect sounds generated by machines, people, physical objects, and can output time varying electrical signals upon detection of the sounds. The microphones can be configured to detect reflection of the sounds off of a storage unit in a facility and/or transmission of sounds through storage units in a facility. The intensities of the reflections of sound and/or the transmission of sounds intensities of the sounds themselves, and the frequencies of the reflections and/or transmissions of sounds can be encoded in the time varying electrical signals. The microphones can transmit the (time varying) electrical signals encoded with the sounds to a computing system.

The computing system can be programmed to receive the time varying electrical signals from the microphones, decode the time-varying electrical signals and estimate storage capacity of a storage unit from which the disparate and arbitrary sounds reflected off of physical objects stored on the storage unit and/or from transmissions of sounds through the storage unit based on the intensity, amplitude, and/or frequency of the sounds. The computing system is further programmed to estimate an available capacity of the at least one storage unit by querying the database using at least one of the intensities, amplitudes, and/or frequencies of the reflections of the sounds, the intensities, amplitudes, and/or frequencies of transmissions of sounds through the storage unit, the intensities, amplitudes, and/or frequencies of the sounds themselves, and/or a combination thereof. As such, exemplary embodiments of the present disclosure can estimate an available capacity without using a predetermined or known source of the sound and without requiring sounds of a specified frequency or amplitude.

In some embodiments, the computing system can be programmed to determine a distance between at least one of the microphones and an origin of at least one of the disparate and arbitrary sounds based on the intensity of the at least one of the sounds detected by at least a subset of the microphones. The computing system can use the distance between the at least one of the plurality of storage units and the sounds and the intensity of the reflections of the sounds to estimate the available capacity of the at least one of the plurality of storage units.

Figure 1A:
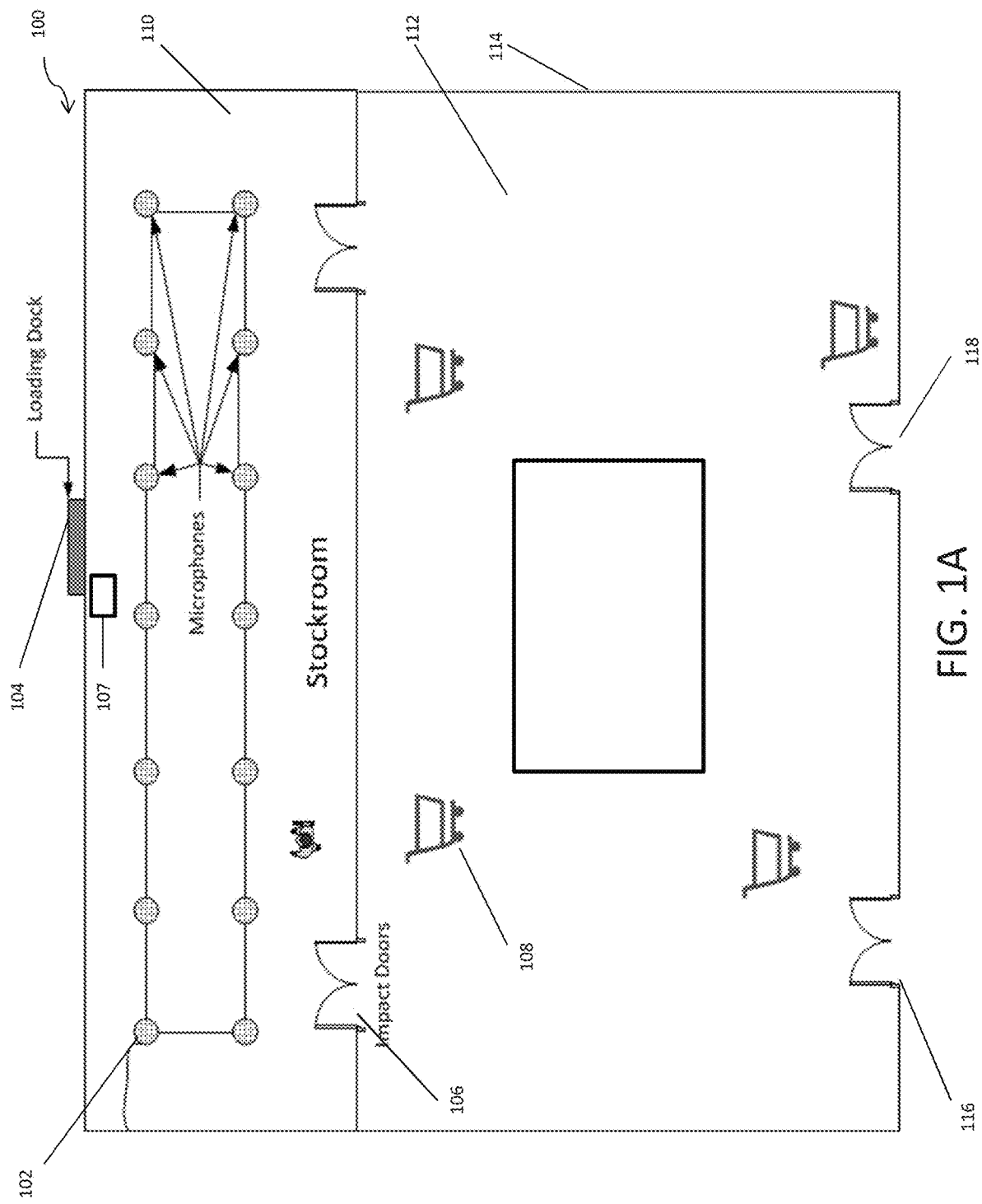
FIG. 1A is a block diagram of microphones disposed in a facility according to the present disclosure.

FIG. 1A is a block diagram of an array microphones 102 disposed in a facility 114 according to the present disclosure. The microphones 102 can be disposed in first location 110 of the facility 114. The microphones 102 can be disposed at a predetermined distance of one another and can be disposed throughout the first location. The microphones 102 can be configured to detect sounds in the first location 110. Each of the microphones 102 in the array can have a specified sensitivity and frequency response for detecting sounds. The microphones 102 can detect the intensity of the sounds, which can be used to determine a distance between the microphones and a location where the sound was produced (e.g., a source or origin of the sound). For example, microphones closer to the source or origin of the sound can detect the sound with greater intensity or amplitude than microphones that are farther away from the source or origin of the sound. A location of the microphones 102 that are closer to the source or origin of the sound can be used to estimate a location of the origin or source of the sound. The sounds can be arbitrary and disparate sounds. An arbitrary and disparate sound can be any sound generated in a facility, where the sound is not generated by the system itself. For example, the sounds could be but are not limited to: box cutting sound, a zoning sound, a breaking down box sound, a rocket cart rolling, a fork of the forklift being raised; a fork of the forklift being lowered, a forklift is being driven and a physical object hitting the floor. Each of the microphones 102 in the array can have a specified sensitivity and frequency response for detecting sounds associated with unloading of trucks 105 and loading of totes 107.

The first location 110 can be a room in a facility. The room can include doors 106 and a loading dock 104. The room can be adjacent to a second location 112. Various physical objects such as carts 108 can be disposed in the second location 112. The microphones 102 can detect sounds of the doors, sounds generated at the loading dock and the sounds generated by physical objects entering from the second location 112 to the first location 110. The second location can include a first and second entrance door 116 and 118. The first and second entrance doors 116 and 118 can be used to enter and exit the facility. The microphones can encode the sounds, the intensities of the sounds, the reflections of the sounds, and the intensities of the reflections of the sounds in time-varying electrical signals. The microphone 102 can transmit the time-varying electrical signals to a computing system.

As an example, the array of microphones 102 can detect a first set of sounds and a second set of sounds. The first set of sounds can correspond to sounds associated with unloading a truck 105 and the second set of sounds can correspond to sounds associated with loading a tote 107. The first set of sounds detected by the microphones 102 can include a truck 105 backing into the loading dock 104 and physical objects can be unloaded from the truck 105 into the first location 110. The second set of sounds detected by the microphones 102 can include loading a tote 107 with physical objects. Other examples of sounds in the first and/or second set of sounds can be one or more of: a truck 105 arriving; pallets of a truck 105 dropping; empty pallets being stacked; cart rolling; conveyer belt sounds; break pack sounds; and placing physical objects in the tote 107.

Because the microphones 102 are geographically distributed within the first location 110, microphones that are closer to the loading docking 104 can detect the sounds with greater intensities or amplitudes as compared to microphones that are farther away from the loading dock 104. As a result, the microphones 102 can detect the same sounds, but with different intensities or amplitudes based on a distance of each of the microphones to the loading dock 104. Thus, a first one of the microphones disposed adjacent to the loading dock 104 can detect a higher intensity or amplitude for a sound emanating from the truck 105 than a second one of the microphones 102 that is disposed farther away from the loading dock 104. The microphones 102 can also detect a frequency of each sound detected. The microphones 102 can encode the detected sounds (e.g., intensities or amplitudes and frequencies of the sound in time varying electrical signals. The time varying electrical signals can be output from the microphones 102 and transmitted to a computing system for processing.

Figure 1B:
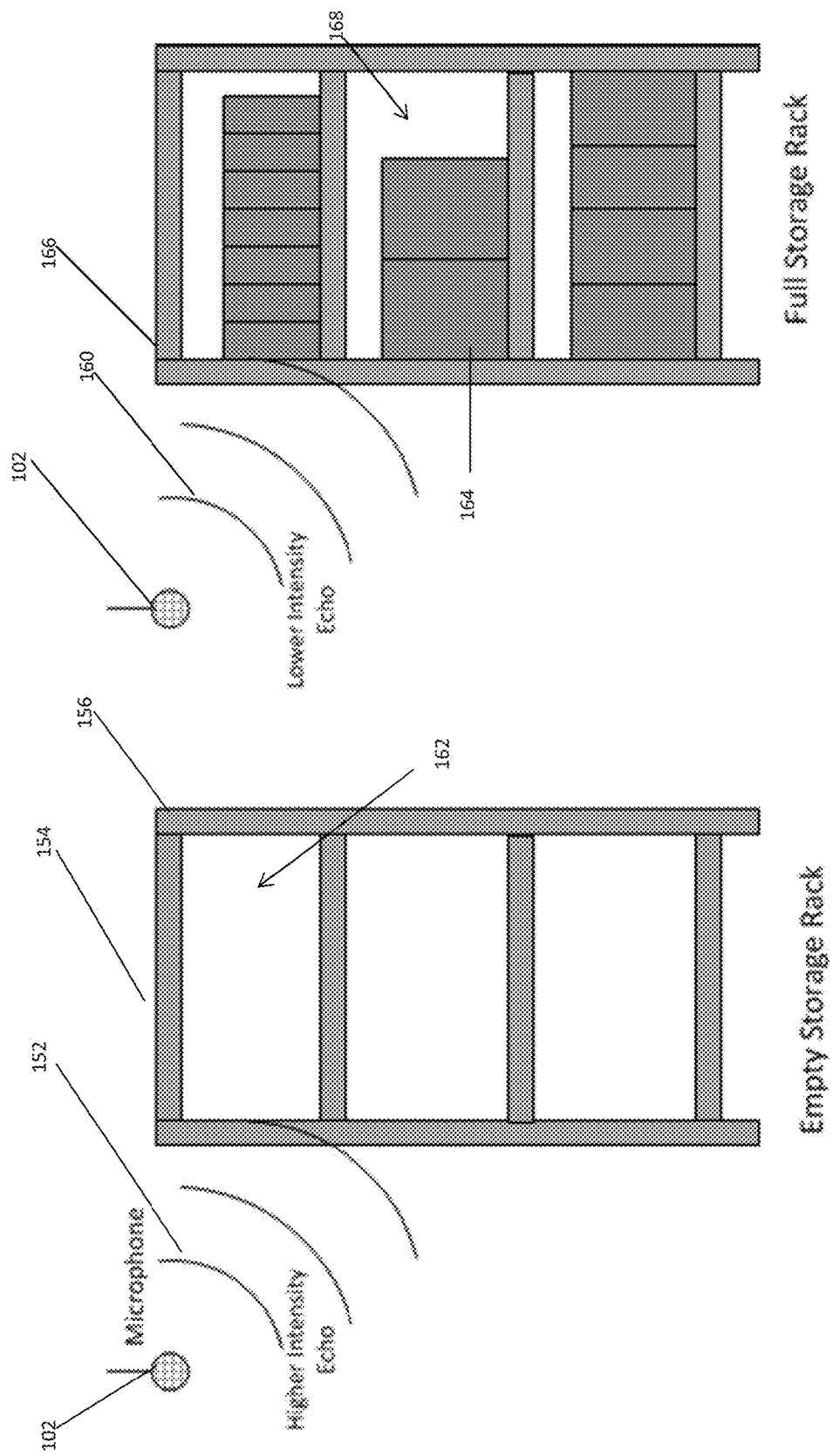
FIG. 1B is a block diagram of microphones detecting echoes disposed near shelving units according to the present disclosure.

FIG. 1B is a block diagram of microphones disposed near shelving units to detect transmissions and reflections of sound according to embodiments of the present disclosure. For example, microphones 102 can be disposed near or in proximity to shelving units 156 and 166, respectively. The microphones 102 can detect sounds reflecting off of the structure of the shelving units 156 and 166 and/or physical objects disposed on the shelving units 156 and 166. The sounds reflecting off of the structures of the shelving units can generate a high intensity echo 152 or a low intensity echo 160. For example, since storage unit 156 is empty and has vacant shelves 162, any sound generated near the shelving unit 156 will produce a high intensity echo 152 in response to reflecting off of the structure of the shelving unit 156. The microphone 102 disposed with respect to the shelving unit 156, can detect and encode the sound generated in near the shelving unit 156, the intensity of the sound, the reflection of the sound and the intensity of the reflection of the sound in time-varying electrical signals.

Alternatively, since physical objects 164 are disposed in the shelves of shelving unit 166, any sound generated near the shelving unit 166 will reflect off of the structure of the shelving unit 166 and the physical objects 164 and generate a low intensity echo 160. The shelving unit 166 has fewer vacant spaces 168 than storage unit 156. Accordingly, part of the intensity of the sounds can be absorbed by physical objects 165 in the shelving unit 166 producing a lower intensity echo 166. The microphone 102 with respect to the shelving unit 166, can detect and encode the sound generated in near the shelving unit 166, the intensity of the sound, the reflection of the sound and the intensity of the reflection of the sound in time-varying electrical signals.

Figure 2:
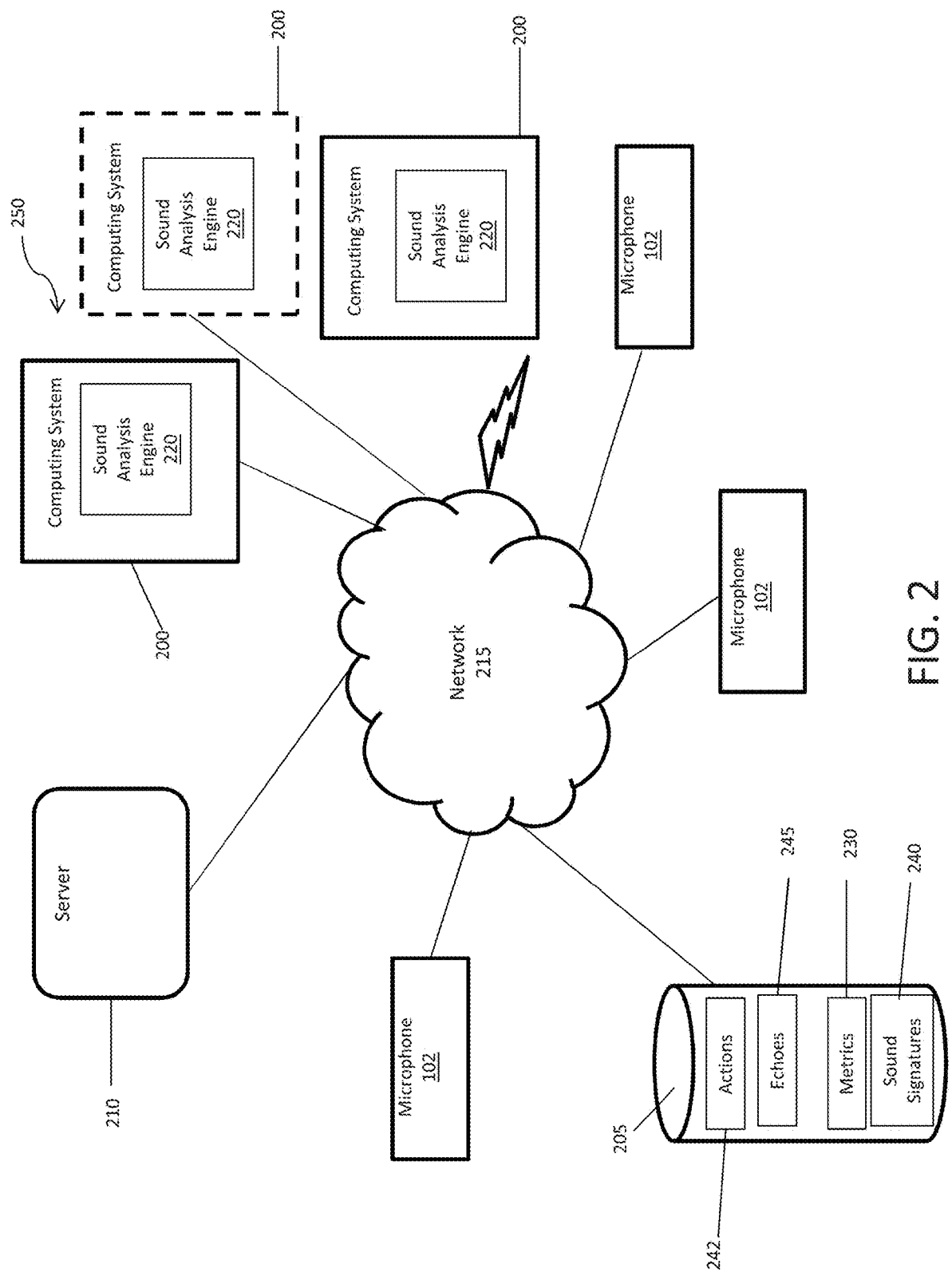
FIG. 2 illustrates an exemplary storage capacity estimation and action identification system in accordance with exemplary embodiments of the present disclosure.

FIG. 2 illustrates an exemplary storage capacity estimation and action identification system in accordance with exemplary embodiments of the present disclosure. The storage capacity estimation and action identification system 250 can include one or more databases 205, one or more servers 210, one or more computing systems 200 and multiple instances of the microphones 102. In exemplary embodiments, the computing system 200 can be in communication with the databases 205, the server(s) 210, and multiple instances of the microphones 102, via a communications network 215. The computing system 200 can implement at least one instance of the sound analysis engine 220.

In an example embodiment, one or more portions of the communications network 215 can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The server 210 includes one or more computers or processors configured to communicate with the computing system 200 and the databases 205, via the network 215. The server 210 hosts one or more applications configured to interact with one or more components of the computing system 200 and/or facilitates access to the content of the databases 205. In some embodiments, the server 210 can host the sound analysis engine 220 or portions thereof. The databases 205 may store information/data, as described herein. For example, the databases 205 can include a metrics database 230, sound signatures database 240, the actions database 242 and echoes database 245. The metrics database 230 can store amount of storage space based on sound or intensity of the reflection of the sound. The sound signature database 240 can store sound signatures based on amplitudes and frequencies for of known sounds. The actions database 242 can store sound patterns (e.g., sequences of sounds or sound signatures) associated with known actions that occur in a facility, including actions performed corresponding with unloading a truck and loading a tote. The echoes database 245 can store identification of the structure causing the an echo. The databases 205 and server 210 can be located at one or more geographically distributed locations from each other or from the computing system 200. Alternatively, the databases 205 can be included within server 210.

In one embodiment, the computing system 200 can receive multiple time-varying electrical signals from an instance of the microphone 102 where each of the time varying electrical signals are encoded to represent sounds (e.g. original sound transmissions and detected reflections of the sounds). The computing system 200 can execute the sound analysis engine 220 in response to receiving the time-varying electrical signals. The sound analysis engine 220 can decode the time-varying electrical signals and extract each transmission of the sounds and reflections of the sounds including intensities, amplitudes, and/or frequencies of the sounds (transmitted and reflected). The sound analysis engine 220 can estimate origin of each sound based on the distance of the microphones from the sound detected by the microphone (e.g., when a subset of microphones detect the sound, the intensities or amplitudes of the sound at each microphone can be a function of the distance of each microphone to the origin of the sound such that microphones closer to the origin of the sound detect the sound with higher amplitudes than microphones farther away from the origin of the sound).

The computing system 200 can execute the sound analysis engine 220 to query the echoes database 245 using the transmission of the sound and the reflection of the sound to retrieve the identification of the type of structure off of which the sound is reflecting. In some embodiments, the sound analysis engine 220 can discard the electrical signal in response to determining the structure is not a type of storage unit. For example, the microphone can detect an sound reflecting off of a wall, vehicle, or machine. The sound analysis engine 220 can determine the wall, vehicle, or machine is not a storage unit and that storage capacity does not need to be determined for the wall, vehicle, or machine. In some embodiments, the sound analysis engine 220 can determine the physical structure is not a storage unit based on a repeated echo effect. For example, sounds maybe reflecting off of a moving object (e.g., a vehicle) and the sound analysis engine 220 can determine that the object is moving based on a quantity of echoes reflecting off of the object at a given location (e.g., if the sound reflects off of the object a single time it can be determined that the object moved from its previous location). As another example, the sound analysis engine 220 can determine the object reflecting the sounds is a still object (e.g., a wall) if the repeated echo effect is constant for long periods of time (e.g., if the sound continues to reflect off of the object over a time period it can be determined that the object has not moved from its location).

In response to determining the structure is a storage unit, the sound analysis engine 220 can query the metrics database 230 using at least one of the following: the transmission of the sound, the intensity of the sound, the reflection of sound and the intensity of the reflection of the sound to estimate amount of capacity of storage space available in the storage unit. For example, the sound analysis engine 220 can use the intensity of the reflection of the sound to determine retrieve the estimated capacity of storage space available in the storage unit. The metrics database 230 can store different intensities that correlate with the different availability of storage space in the storage unit. The sound analysis engine 220 can determine the estimated capacity of storage space available in the storage unit. In some embodiments, the sound analysis engine 220 can query the metrics database using the determined distance between the microphone with sound and at least one of the following: the transmission of the sound, the intensity of the transmission of the sound, the reflection of sound and the intensity of the reflection of the sound to estimate amount of capacity of storage space available in the storage unit. In some embodiments, the reflection can be associated with a sound of physical objects being removed or deposited on the storage unit. The sound analysis engine 220 can determine an amount of physical objects removed and/or deposited on/from the storage unit based on the detected reflection as described above. Additionally, the sound analysis engine 220 can determine the amount of physical objects remaining on or in the storage unit based on the amount of physical objects removed and/or deposited on the storage unit and the detected reflection.

In one embodiment, a microphone 102 can detect two sets of sounds, the intensities for each set of sounds, the reflection of each set of sounds and the intensities of the reflection for each set of sounds. The microphone 240a can encode and transmit time-varying electrical signals encoded with each sound of the two sets of sounds to the computing system 200. The computing system 200 can execute the sound analysis engine 220 and the sound analysis engine 220 can decode the time-varying electrical signals. The sound analysis engine 220 can distinguish the two sets of sounds from each other.

In some embodiments, microphone 102 can detect a sound reflecting off of first and second storage units. The microphone 102 can encode each sounds, the reflection of each set of sounds and the intensities of the reflection for each set of sound into time-varying electrical signals. The microphone 102 can transmit the encoded time-varying electrical signals to the computing system 200. The computing system 200 can execute the sound analysis engine 220 in response to receiving the time-varying electrical signals. The sound analysis engine 220 can decode the time-varying electrical signal. The sound analysis engine 220 can distinguish between the reflection of the sound which reflected off the first storage unit and the reflection of the sound which reflected off the second storage unit. The sound analysis engine 220 can determine the capacity of storage space available in the first and second storage unit based on the same sound reflected off of the first and second storage unit.

In some embodiments, the computing system 200 can receive electrical signals from two or more different microphones. The sound analysis engine 220 can determine the electrical signals received from the first microphone can be encoded with a sound, the intensity of the sound and the frequency and amplitude of the sound. The sound analysis 220 can determine the electrical signals received from the second microphone can be encoded with the reflection of the same sound as detected by the first microphone, off of a storage unit in the facility and the intensity of the reflection of the sound. The sound analysis engine 220 can determine the location of the sound based on the intensity of the sound detected by the first microphone. The sound analysis engine 220 can determine the angle of the reflection of the sound off of the storage unit detected by the second microphone, based on the determined location of the sound and the location of the second microphone. The sound analysis engine 220 can query the metrics database 230 using the intensity of the reflection of the sound detected by the second microphone and the determined angle of the reflection of the sound to determine the storage capacity of the storage unit.

In exemplary embodiments, the sound analysis engine 220 can determine the distance of the microphones 102 to the location where the sound occurred based on the intensity or amplitude of the sound detected by each microphone. The sound analysis engine 220 can estimate the location of each sound based on the distance of the microphone from the sound detected by the microphone. In some embodiments, the location and of the sound can be determined using triangulation or trilateration. For example, the sound analysis engine 220 can determine the location of the sounds based on the sound intensity detected by each of the microphones 102 that detect the sound. Based on the locations of the microphones, the sound analysis engine can use triangulation and/or trilateration to estimate the location of the sound, knowing the microphones 102 which have detected a higher sound intensity are closer to the sound and the microphones 102 that have detected a lower sound intensity are farther away. The sound analysis engine 220 can query the sound signature database 240 using the amplitude and frequency to retrieve the sound signature of the sound. The sound analysis engine 220 can identify the sounds encoded in each of the time varying electrical signals based of the retrieved sound signature(s) and the distance between the microphone and the origins or sources of the sounds.

The sound analysis engine 220 can determine a sound pattern based on the identification of each sound, the chronological order of the sounds and time intervals between the sounds. The sound pattern can include the identification of each sound, the estimated location of each sound, the chronological order of the sound and the time interval in between each sound. In response to determining the sound pattern, the computing system 200 can query the actions database 242 using the determined sound pattern to retrieve the identification of the action (e.g. a truck arriving; pallets of a truck dropping; empty pallets being stacked; cart rolling; conveyer belt sounds; break pack sounds; and placing physical objects in the tote) being performed by matching the determined sound pattern to a sound pattern stored in the actions database 230 within a predetermined threshold amount (e.g., a percentage). In some embodiments, in response to the sound analysis engine 220 being unable to identify a particular sound, the computing system 200 can disregard the sound when determining the sound pattern. The computing system 200 can issue an alert in response to identifying the action. The sound analysis engine 220 can identify sounds which correspond to unloading a truck or corresponds with loading a tote. The sound analysis engine can group the sounds which correspond to unloading of a truck into the first set of sounds and the sounds which correspond to loading a tote into a second set of sounds. For example, the first set of sounds can include a truck backing up into the loading dock, a pallet dropping, and physical objects being unloaded. The second set of sounds can include sounds of physical objects being loaded into a tote.

The computing system 200 can execute the sound analysis engine 220 to estimate the fullness of a tote being loaded with physical objects. The sound analysis engine 220 can query the metrics database 240 using the intensity of the second set of sounds to retrieve an amount of capacity left in the tote correlated with the intensity of the sounds. The sound analysis engine 220 can estimate the fullness of the tote based on the amount of capacity left in the tote. For example, the sound of physical objects being loaded into a tote can produce a higher intensity if the tote is empty and a lower intensity if a tote is full. In some embodiments, the sound analysis engine 220 can determine if a first tote is full and a second tote is needed. In other embodiments, the computing system 200 can determine how many totes have been filled up in the process of unloading physical objects from a truck, for example, to estimate a status of the truck unloading process, verify the volume of physical objects unloaded from the truck, determine a rate at which the truck is unloaded, and the like.

In some embodiments, the sound analysis engine 220 can receive and determine that a same sound was detected by multiple microphones, encoded in various electrical signals, with varying intensities, amplitudes, and frequencies. The sound analysis engine 220 can determine the a first electrical signal is encoded with the highest intensity or amplitude as compared to the remaining electrical signals with the same sound. The sound analysis 220 can query the sound signature database 240 using the sound, intensity and amplitude and frequency of the first electrical signal to retrieve the identification of the sound encoded in the first electrical signal and discard the remaining electrical signals encoded with the same sound but with lower intensities or amplitudes than the first electrical signal.

As a non-limiting example, the storage capacity estimation and action identification system 250 can be implemented in a retail store. An array of microphones can be disposed in a stockroom or the sales floor of a retail store. A plurality of products sold at the retail store can be stored in the stockroom in shelving units or in shelving units in the sales floor. The facility can also include impact doors, transportation devices such as forklifts or cranes, customers, shopping carts, and a loading dock entrance. The microphones can detect sounds generated by various physical objects in the retail store. The sounds can be arbitrary and disparate sounds including but not limited to box cutting sound, a zoning sound, a breaking down box sound, a rocket cart rolling, a fork of the forklift being raised, a fork of the forklift being lowered, a forklift is being driven and a physical object hitting the floor.

For example, a first microphone (out of the array of microphones) can detect a first sound of a wrench falling on the floor. A second microphone can detect the same sound of the wrench falling on the floor. The first microphone and second microphone can be disposed near a first and second shelving unit respectively. A greater number of physical objects or products can be disposed in the second shelving unit than the first shelving unit. A third microphone disposed near a wall can detect the sound of the wrench falling on the floor. The first, second and third microphones can also detect the intensity of the sound of the wrench falling on the floor, the reflection of the sound of the wrench falling on the floor reflecting off of the first shelving unit, second shelving unit and the wall, respectively, the intensity of the reflection of the sound and the intensity of the sound. The first, second, and third microphones can encode the intensity and frequency of the sound and the intensity and frequency of the reflection of the sound into a first, second and third electrical signal. The electrical signals can be transmitted to the computing system 200.

The computing system 200 can receive the first, second and third electrical signals. The computing system 200 can automatically execute the sound analysis engine 220. The sound analysis engine can decode the intensity and frequency of the sound the intensity and frequency of the reflection of the sound from the first, second and third electrical signals. The sound analysis engine 220 can query the echoes database 245 using, the intensity and frequency of the sound and the intensity and frequency of the reflection of the sound to identify the structure from which the sound is reflected. The sound analysis engine 220 can determine the first and second microphone detected the sound of the wrench falling on the floor reflecting off of the first and second shelving unit, respectively, and the third microphone detected the sound of the wrench falling on the floor reflecting off of the wall. The sound analysis engine 220 can determine the wall is not a storage unit and can discard the third electrical signal.

The sound analysis engine 220 can determine the distance between the first and second microphone and the sound of the wrench falling on the floor detected by the first and second microphone microphone based on the intensity of the sound encoded in the first and second electrical signals. The sound analysis engine 220 can also determine the origin of the sound based on the distance between the first and second microphone and the sound of the wrench falling on the floor. The sound analysis engine 220 can query the metrics database 230 using one or more of: the determined distance between the sound and the first and second microphone, the sound detected by the first and second microphone, the intensity of the sound detected by first and second microphone, the reflection of the sound detected by the first and second microphone and the intensity of the reflection of the sound detected by the first and second microphones to estimate an amount of available storage capacity in a shelving unit correlated with the decoded information. As an example, the metrics database 230 can return an amount of available storage capacity correlated for with the decoded information for the first shelving unit and an amount of available storage capacity correlated with the decoded information for the second shelving unit. The amount of available storage capacity correlated with the decoded information for the first shelving unit can be greater than the amount of available storage capacity correlated with the decoded information for the second shelving unit due to the greater amount of physical objects disposed on the second shelving unit.

The sound analysis engine 220 can transmit the estimated amount of storage capacity correlated with the decoded information for the first shelving unit and an amount of storage capacity correlated with the decoded information for the second shelving unit to the computing system 200. The computing system 200 can estimate the available storage capacity in the first and second storage units. In some embodiments, the computing system 200 can transmit an alert based on the estimate of the available storage capacity in the first and second storage unit.

In one embodiment, the sound analysis engine 220 can identify sounds which correspond to unloading a truck or corresponds with loading a tote. Products to be stocked at the retail store can be unloaded from a truck. Additionally, a tote can be loaded with products from the store for delivery to a customer and/or unloaded from a truck for stocking in the retail store. The sound analysis engine can group detected sounds which correspond to unloading of a truck into a first set of sounds and detected sounds which correspond to loading a tote into a second set of sounds.

The sound analysis engine 220 can estimate the fullness of a tote being loaded with products. The sound analysis engine 220 can query the metrics database 240 using the intensity of the second set of sounds to retrieve an amount of capacity left in the tote correlated with the intensity of the sounds. The sound analysis engine 220 can estimate the fullness of the tote based on the amount of capacity left in the tote. In some embodiments, the sound analysis engine 220 can determine if a first tote is full and a second tote is needed. In other embodiments, the computing system 200 can determine how many totes have been filled up in the process of unloading physical objects from a truck, for example, to estimate a status of the truck unloading process, verify the volume of physical objects unloaded from the truck, determine a rate at which the truck is unloaded, and the like.

Figure 3:
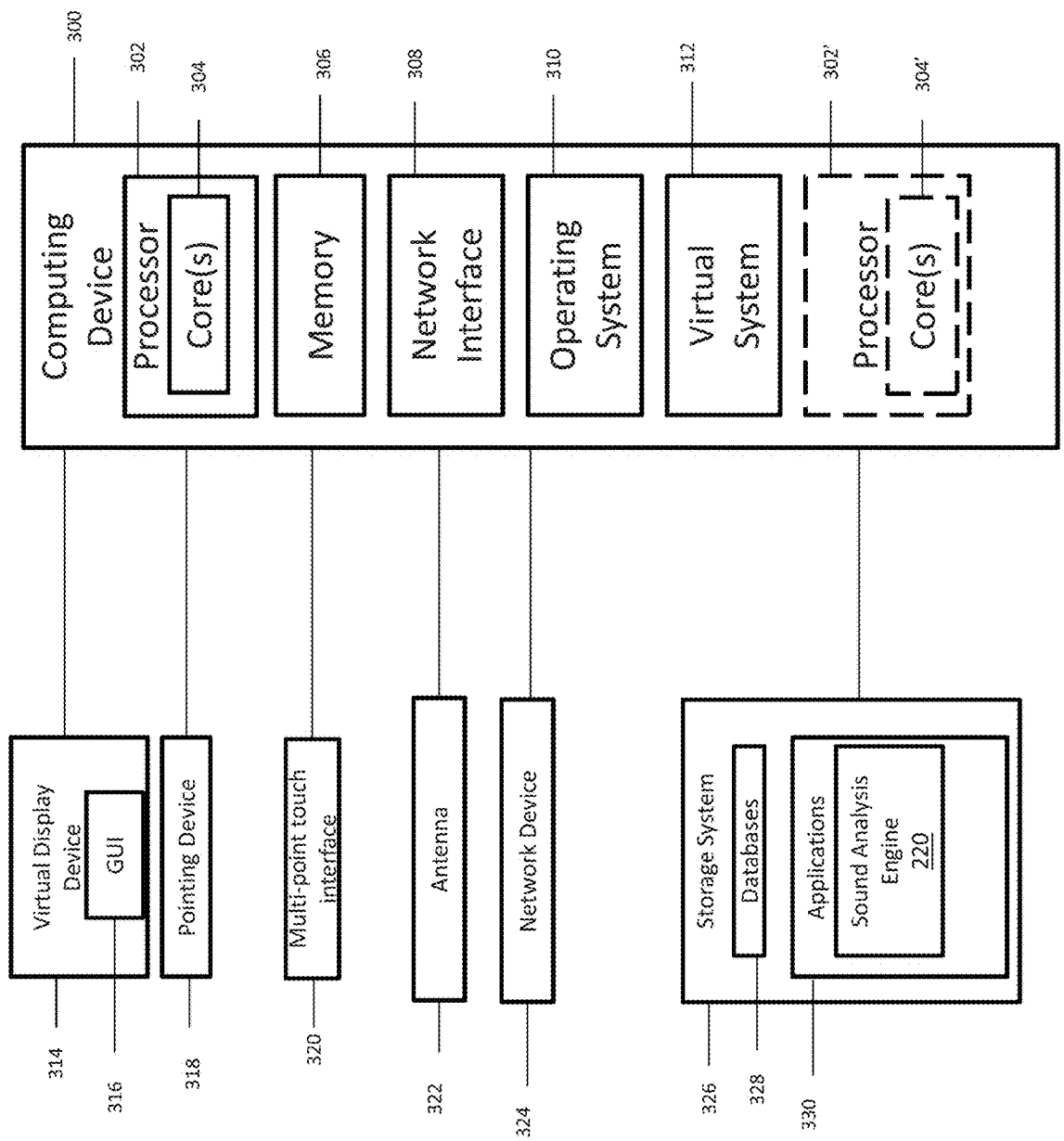
FIG. 3 illustrates an exemplary computing device in accordance with exemplary embodiments of the present disclosure.

FIG. 3 is a block diagram of an example computing device for implementing exemplary embodiments of the present disclosure. Embodiments of the computing device 300 can implement the storage capacity estimation and action identification system. For example, the computing device 300 can be embodied as part of the computing system. The computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the computing device 300 may store computer-readable and computer-executable instructions or software (e.g., applications 330 such as the sound analysis engine 220) for implementing exemplary operations of the computing device 300. The computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

Virtualization may be employed in the computing device 300 so that infrastructure and resources in the computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the computing device 300 through a visual display device 314, such as a computer monitor, which may display one or more graphical user interfaces 316, multi touch interface 320 and a pointing device 318.

The computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 328 for storing information regarding actions, sound signatures, available space in a storage unit and echoes of sounds as well as relationship between the available space in a storage unit and echoes of sounds. The databases 328 may be updated manually or automatically at any suitable time to add, delete, and/or update one or more data items in the databases.

The computing device 300 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 322 to facilitate wireless communication (e.g., via the network interface) between the computing device 300 and a network and/or between the computing device 300 and other computing devices. The network interface 308 may include a built-in network adapter, network interface card, PCMCIA network card, card bus network adapter, wireless network adapter, USB network adapter, modem or any other device suitable for interfacing the computing device 300 to any type of network capable of communication and performing the operations described herein.

The computing device 300 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 300 and performing the operations described herein. In exemplary embodiments, the operating system 310 may be run in native mode or emulated mode. In an exemplary embodiment, the operating system 310 may be run on one or more cloud machine instances.

Figure 4:
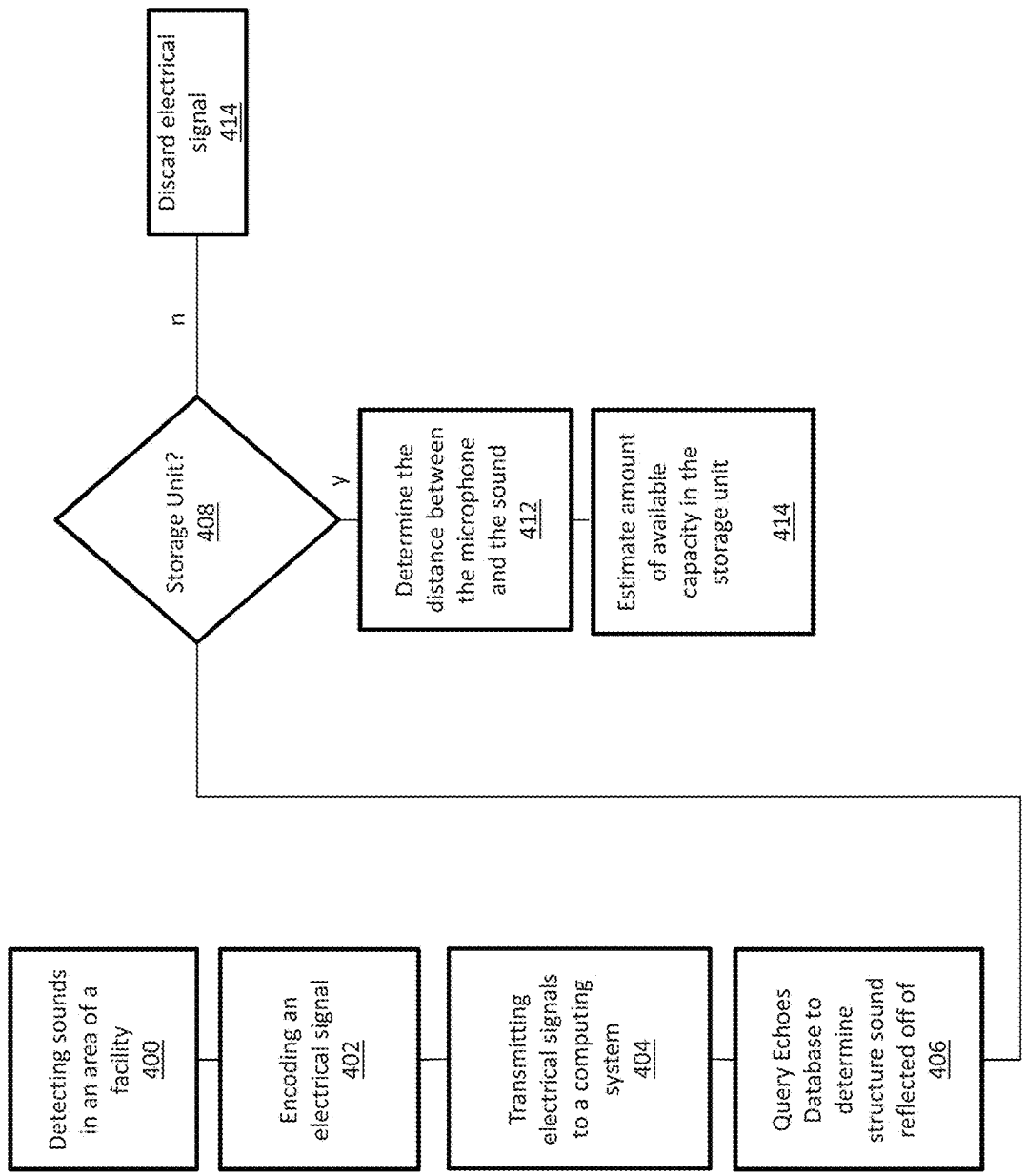
FIG. 4 is a flowchart illustrating an storage capacity estimation and action identification system according to exemplary embodiments of the present disclosure.

FIG. 4 is a flowchart illustrating the storage capacity estimation and action identification system according to exemplary embodiments of the present disclosure. In operation 400, an array of microphones (e.g. microphones shown 102 FIGS. 1A, 1B and 2) disposed in a first location (e.g. first location 110 shown in FIG. 1A) in a facility (e.g. facility 114 shown in FIG. 1A) can detect arbitrary and disparate sounds generated by in the facility. The microphones can also detect the intensity and frequencies of the transmission of sounds, the reflection of the sound reflecting off of a structure, and the intensity and frequencies of the reflection of the sound. The first location can be adjacent to a second location (e.g. second location 112 shown in FIG. 1A). The first location or second location can include storage units (e.g. shelving units 156, 166 shown in FIGS. 1A and 1B), an entrance to a loading dock (e.g. loading dock entrance 104 shown in FIG. 1A), impact doors (e.g. impact doors 106 shown in FIG. 1A). Carts can be disposed in the second location and can enter into the first location to the impact doors. The second location can include a first and second entrance (e.g. first and second entrance doors 116 and 118 shown in FIG. 1A) to the facility. The microphones can be disposed near the storage units (e.g., shelving units). The sounds can be generated by the impact doors, the carts, and by other actions occurring in the facility.

In operation 402, the microphones can encode each the intensity and frequencies of the sound and the intensity and frequency of the reflection of the sound into a time-varying electrical signals. For example, a microphone can detect the transmission of sound at a first time and a reflection of the sound from a structure at a second time. Each sound can be encoded into a different electrical signals (or the same electrical signal but a different times, e.g., a continuous time varying electrical signal). The intensity of the sound can depend on the distance between the microphone and the location of the occurrence of the sound. For example, the greater the distance the lower the intensity of the sound. In operation 404, the microphones can transmit the encoded electrical signals to the computing system (e.g. computing system 200 as shown in FIG. 2). The microphones can transmit the electrical signals in the order the microphones detected the sounds. In some embodiments, the sound analysis engine can determine the identification physical structure based on the location of the microphone.

In operation 406, the computing system can receive the electrical signals, and in response to receiving the electrical signals, the computing system can execute the sound analysis engine (e.g. sound analysis engine 220 as shown in FIG. 2). The sound analysis engine can decode the electrical signals and extract the intensity and/or frequency of the sound and the intensity and/or frequency of the reflection of the sound. The sound analysis engine can query the echoes database (e.g. echoes database shown 245 in FIG. 2) using the intensity and/or frequency of the sound, the intensity and/or frequency of the reflection of the sound, and/or a difference between the intensity and/or frequency of the sound and the intensity and/or frequency of the reflection of the sound to identify the structure from which the sound is reflected. In operation 408, the sound analysis engine will determine whether the retrieved structure is a storage unit. In operation 410, in response to determining the retrieved structure is not a storage unit, the sound analysis engine will discard the electrical signal associated with the decoded sound. In operation 412, in response to determining the structure is a storage unit, the sound analysis engine can determine the distance between the microphone and the location of the occurrence of the sound based on the intensity of the sound.

In operation 414, the sound analysis engine can query the metrics database (e.g. metrics database 230 shown in FIG. 2) using one or more of: the intensity and/or frequency of the sound, the intensity and/or frequency of the reflection of the sound, and/or the difference between the intensity and/or frequency of the sound and the intensity and/or frequency of the reflection of the sound to estimate an amount of available capacity in the storage unit. In some embodiments, the sound analysis engine can also use the determined distance between the sound and the microphone along with the extracted sound, the intensity and/or frequency of the sound, the intensity of the reflection of the sound, and/or the difference between the intensity and/or frequency of the sound and the intensity and/or frequency of the reflection of the sound to estimate the amount of available storage capacity in the storage unit. In some embodiments, the computing system can transmit an alert in response to estimating the amount of available storage capacity in the storage unit.

FIG. 5 is a flowchart illustrating a process implemented by a tote fullness detection system according to exemplary embodiments of the present disclosure. In operation 500, an array of microphones (e.g. microphones 102 shown in FIG. 1) disposed in a first location (e.g. first location 110 shown in FIG. 1) in a facility (e.g. facility shown 114 in FIG. 1) can detect sounds generated by actions performed in the first location of the facility. The first location can include shelving units, an entrance to a loading dock (e.g. loading dock entrance 104 shown in FIG. 1), impact doors (e.g. impact doors 106 shown in FIG. 1). The sounds can be one or more of: a truck (e.g. truck 105 as shown in FIG. 1) arriving; pallet of a truck dropping; empty pallet stacking; rocket cart rolling; conveyer sounds; break pack sounds; and tossing physical objects in the tote (e.g. tote 107 as shown in FIG. 1).

In operation 502, the microphones can encode each sound, intensity of the sound, amplitude and frequency of each sound into time varying electrical signals. The intensity or amplitude of the sounds detected by the microphones can depend on the distance between the microphones and the location at which the sound originated. For example, the greater the distance a microphone is from the origin of the sound, the lower the intensity or amplitude of the sound when it is detected by the microphone. In operation 504, the microphones can transmit the encoded time varying electrical signals to the computing system. The microphones can transmit the time varying electrical signals as the sounds are detected.

In operation 506, the computing system can receive the time varying electrical signals, and in response to receiving the time varying electrical signals, the computing system can execute embodiments of the sound analysis engine (e.g. sound analysis engine 220 as shown in FIG. 2), which can decode the time varying electrical signals and extract the detected sounds (e.g., the intensities, amplitude, and frequency of the sounds). The computing system can execute the sound analysis engine to query the sound signature database (e.g. sound signature database 245 shown in FIG. 2) using the intensities, amplitudes and/or frequencies encoded in the time varying electrical signals to retrieve sound signatures corresponding to the sounds encoded in the time varying electrical signal. In operation 508, the sound analysis engine can be executed to estimate a distance between the microphones and the location of the occurrence of the sound based on the intensities or amplitudes. The sound analysis engine can be executed to determine the identification of the sounds encoded in the electrical signals based on the sound signature and the distance between the microphones and occurrence of the sound.

In operation 510, the computing system can determine a chronological order in which the identified sounds occurred based on the order in which the time varying electrical signals were received by the computing system. The computing system can also determine the time intervals between the sounds in the time varying electrical signals based on the time interval between receiving the time varying electrical signals. In operation 512, the computing system can determine a sound pattern based on the identification of the sounds, the chronological order of the sounds and the time interval between the sounds.

In operation 514, the computing system can determine the action causing the sounds detected by the array of microphones by querying the actions database (e.g. actions database 242 in FIG. 2) using the sound pattern to match a sound pattern of an action by a predetermined threshold amount (e.g., percentage).

In operation 516, the sound analysis engine 220 can divide the sounds into a first set of sounds and a second set of sounds based on the identified actions of the sounds. The first set of sounds can correspond with a unloading of physical objects from a truck. The second set of sounds can correspond with loading physical objects into a tote. In operation 518, the sound analysis engine 220 can query the metrics database (e.g. metrics database 230 in FIG. 2) using the intensity of the second set of sounds to retrieve an amount of capacity in a tote correlated with the intensity of the second set of sounds. The sound analysis engine can estimate the fullness of the tote based on the retrieved amount of capacity.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A storage capacity estimation and action identification system, comprising:
   an array of microphones disposed in an area of a facility that includes a plurality of storage units, the microphones being configured to detect arbitrary sounds in the area and to detect reflections of the arbitrary sounds from at least one of the plurality of storage units, the microphones being configured to output time varying electrical signals upon detection of the arbitrary sounds and the reflections; and
   a computing system operatively coupled to the array of microphones, the computing system programmed to:
   receive the time varying electrical signals associated with the arbitrary sounds and the reflections;
   determine which of the arbitrary sounds correspond to each of the reflections; and
   estimate an available capacity of the at least one storage unit based on a relationship of the arbitrary sounds to the reflections corresponding to the arbitrary sounds.

2. The system in claim 1, wherein the microphones are further configured to detect intensities of the arbitrary sounds and the reflections of the arbitrary sounds and encode the intensities of the arbitrary sounds and the reflections of the arbitrary sounds in the time varying electrical signals.

3. The system in claim 2, further comprising:
   a database including metrics for determining the available capacity of the at least one of the plurality of storage units based on the intensities of the arbitrary sounds and the reflections of the arbitrary sounds.

4. The system in claim 3, wherein the computing system is further programmed to query the database using at least one of the intensities of the reflections of the arbitrary sounds or a combination of the intensities of the arbitrary sounds and the reflections to retrieve the available capacity of the at least one storage unit.

5. The system in claim 4, wherein the microphones detect intensities of arbitrary sounds prior to the arbitrary sounds reflecting off the at least one of the plurality of storage units.

6. The system in claim 5, wherein the computing system is further programmed determine the distance between the at least one of the plurality of storage units and the arbitrary sounds based on the intensity of the arbitrary sounds prior to the arbitrary sounds reflecting off the at least one of the plurality of storage units.

7. The system in claim 6, wherein the computing system is further programmed to use the distance between the at least one of the plurality of storage units and the arbitrary sounds and the intensity of the reflections of the arbitrary sounds to estimate the available capacity of the at least one of the plurality of storage units.

8. The system in claim 1, wherein the microphones are configured to detect a first set of reflections of the arbitrary sounds in response to at least some of the arbitrary sounds reflecting off of a first storage unit and a second set of reflections of the arbitrary sounds in response to at least some of the arbitrary sounds reflecting off of a second storage unit.

9. The system in claim 8, wherein the computer system is further programmed to distinguish between the first set of reflections of the arbitrary sounds and the second set of reflections of the arbitrary sounds.

10. The system in claim 1, wherein a first one of the microphones detects the reflections of the arbitrary sounds in response to at least some of the arbitrary sounds reflecting off of more than one of the plurality of storage units.

11. A storage capacity estimation method, comprising:
    detecting arbitrary sounds via an array of microphones disposed in an area of a facility that includes a plurality of storage units;
    detecting, via the microphones, reflections of the arbitrary sounds from at least one of the plurality of storage units;
    outputting, via the microphones, time varying electrical signals upon detection of the arbitrary sounds and the reflections;
    receiving, via a computing system operatively coupled to the array of microphones, the time varying electrical signals associated with the arbitrary sounds and the reflections;
    determining, via the computing system, which ones of the arbitrary sounds correspond to each of the reflections; and
    estimating, via the computing system, an available capacity of the at least one of the plurality of storage units based on a relationship of the arbitrary sounds to the reflections.

12. The method in claim 11, further comprising:
    detecting via the microphones, intensities of the arbitrary sounds and the reflections of the arbitrary sounds; and
    encoding the intensities of the arbitrary sounds and the reflections of the arbitrary sounds in the time varying electrical signals.

13. The method in claim 12, further comprising:
    determining, via the computing system, the available capacity of the at least one of the plurality of storage units based on the intensities of the arbitrary sounds and the reflections of the arbitrary sounds.

14. The method in claim 13, wherein determining the available capacity of the at least one of the plurality of storage units comprises:
    querying a database within the computing system using at least one of the intensities of the reflections of the arbitrary sounds or a combination of the intensities of the arbitrary sounds and the reflections to retrieve the available capacity of the at least one storage unit; and
    determining the available capacity based on one or more metrics returned in response to the query.

15. The method in claim 14, further comprising detecting, via the microphones, intensities of arbitrary sounds prior to the arbitrary sounds reflecting off the at least one of the plurality of storage units.

16. The method in claim 15, further comprising:
    determining, via the computing system, the distance between the at least one of the plurality of storage units and the arbitrary sounds based on the intensity of the arbitrary sounds prior to the arbitrary sounds reflecting off the at least one of the plurality of storage units.

17. The method in claim 16, further comprising:
    estimating the available capacity of the at least one of the plurality of storage units based on the distance between the at least one of the plurality of storage units and the arbitrary sounds and the intensity of the reflections of the arbitrary sounds.

18. The method in claim 11, further comprising:
    detecting, via the microphones, a first set of reflections of the arbitrary sounds in response to at least some of the arbitrary sounds reflecting off of a first storage unit and a second set of reflections of the arbitrary sounds in response to at least some of the arbitrary sounds reflecting off of a second storage unit.

19. The method in claim 18, further comprising:
    distinguishing, via the computing system, between the first set of reflections of the arbitrary sounds and the second set of reflections of the arbitrary sounds.

20. The method in claim 11, further comprising:
    detecting, via a first one of the microphones, the reflections of the arbitrary sounds in response to at least some of the arbitrary sounds reflecting off of more than one of the plurality of storage units.

21. A system for determining fullness of a tote based on detected sounds produced by unloading a truck or an environment within which the truck is unloaded, the system comprising:
    an array of microphones disposed in a first area of a facility, the microphones being configured to detect sounds and output time varying electrical signals upon detection of the sounds; and
    a computing system operatively coupled to the array of microphones, the computing system programmed to:
    receive the time varying electrical signals associated with the sounds detected by at least a subset of the microphones;
    separating the sounds into a first set of sounds and a second set of sounds based on the time varying electric signals;
    determine the first set of sounds corresponds to unloading of physical objects from a truck;
    determine the second set of sounds corresponds loading of a tote;
    determine time intervals between the sounds in the first set of sounds and the sounds in the second set of sounds to detect the physical objects being loaded into the tote in response to unloading of the truck; and
    estimating fullness of the tote based on the second set of sounds.

* * * * *